July 13, 1954   G. KLEMT ET AL   2,683,398
OPTICAL SYSTEM WITH FOUR AIR-SPACED MEMBERS
Filed March 20, 1953
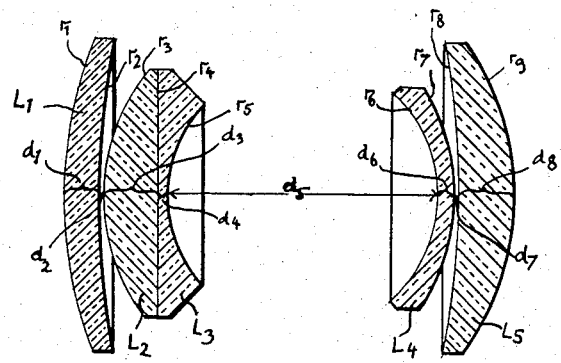
GÜNTER KLEMT
KARL H. MACHER
   INVENTORS
BY
   Karl F. Ross
      AGENT Patented July 13, 1954

2,683,398

UNITED STATES PATENT OFFICE 2,683,398

OPTICAL SYSTEM WITH FOUR AIR-SPACED MEMBERS

Günter Klemt and Karl Heinrich Macher, Kreuznach, Germany, assignors to Jos. Schneider & Co., Kreuznach, Germany Application March 20, 1953, Serial No. 343,545

Claims priority, application Germany March 20, 1952

4 Claims. (Cl. 88—57)

Our present invention relates to an optical system constructed along the lines of the well-known Gaussian dual objective and adapted both for the taking and the reproduction of pictures.

The known objectives of the type referred to consist, generally, of two meniscus-shaped dispersive members, preferably cemented, which between them enclose the diaphragm space, the concave faces of these members facing said diaphragm space. These two inner members are, in turn, positioned between two collective members, one each on the side of the incoming and the outgoing rays, the forward one of these latter members (seen from the side of the longer light rays) being distinctly meniscus-shaped. The centers of curvature of the refractive surfaces, with the possible exception of the cemented surfaces, are located at the side of the diaphragm. Conventional objectives of this type generally consist of six or seven lenses and have long been used for aperture ratios ranging from about 1:3.3 to 1:1.4.

One of the objects of this invention is to provide an optical system of the character set forth which, while retaining the properties of such objectives to correct for sphero-chromatic aberration of rays incident parallel or inclined to the optical axis, astigmatism, image field curvature and other distortion, consists of not more than five lenses forming four air-spaced members.

In our co-pending application Ser. No. 265,091, filed January 5, 1952, we have disclosed a Gaussian-type objective of this description wherein, particularly for the purpose of eliminating residual coma, extremely highly refractive glass is used in the two collective menisci as well as in at least the positive portion of the first dispersive meniscus and in the second dispersive member (described as at least roughly meniscus-shaped). While this objective will indeed satisfy the foregoing object, it requires the use of relatively expensive refractive material in most elements of the system. It is, accordingly, another object of our present invention to provide an objective of the type disclosed in our aforesaid co-pending application wherein, however, less highly refractive and, therefore, less costly glass is used for at least some of the elements while the corrective power of the objective is substantially fully maintained if not increased.

An objective according to this invention is similar to that of our said co-pending application in that it comprises a dispersive meniscus both in back and in front of the diaphragm space, only the forward one of these members being of the compound, preferably cemented, type; this set of members is, in turn, inserted between a front and a rear collective meniscus. In accordance with the present invention, the mean of the refractive indices of the two outer collective menisci for the yellow helium line ranges between 1.68 and 1.72, the index of refraction of the rear collective meniscus alone being, at the same time, appreciably less than 1.68 and the refractive index of the inner rear, dispersive meniscus being greater than 1.78; the first lens of the compound first inner, dispersive member, i. e. the collective lens immediately following the front lens, has an index of refraction for the yellow helium line which is less than 1.63 and which is exceeded by the refractive index of the associated dispersive lens preferably cemented thereto, the difference between the refractive indices of the two lenses of said compound member being at least substantially 0.03.

The partial use of less highly refractive glass in comparison with the system of our earlier disclosure requires, for the maintenance of corrective power, that greater curvature be imparted to certain of the lens faces. In the present system, accordingly, the lens radii of the compound, dispersive meniscus ahead of the diaphragm are preferably so dimensioned that the ratio of the length of the outer front radius to that of the outer rear radius thereof ranges between 1.5 and 1.6, the length of said outer front radius being at the same time not more than substantially 0.3 but greater than 0.2 times the overall focal length of the objective.

A further desirable feature of the invention, designed to improve the off-axial image field portions, resides in dimensioning the total axial length of the system at about 0.5 times the overall focal length thereof.

A preferred embodiment of the invention has been illustrated, somewhat schematically, in the sole figure of the accompanying drawing.

As shown in the drawing, the objective according to the invention comprises a first collective meniscus consisting of a simple lens $L_1$ having a thickness $d_1$ and radii of curvature $r_1$, $r_2$; a first dispersive meniscus consisting of two cemented lenses $L_2$ (thickness $d_3$) and $L_3$ (thickness $d_4$), spaced by a distance $d_2$ from lens $L_1$ and having radii $r_3$, $r_4$ and $r_5$ (all positive in the embodiment illustrated); a second dispersive meniscus consisting of a simple lens $L_4$ having a thickness $d_6$ and radii $r_6$ and $r_7$, the air space $d_5$ between the latter and the compound member $L_2$, $L_3$ serving to receive the diaphragm (not shown); and a second collective meniscus consisting of a simple lens $L_5$ having a thickness $d_8$ and radii $r_8$, $r_9$, the spacing between the lenses $L_4$ and $L_5$ being designated $d_7$.

Representative values of the parameters $r$ and $d$, the indices of refraction $n_d$ for the yellow helium line and the Abbé numbers $V_d$ for the respective lenses $L_1$–$L_5$ have been given, by way of example, in the following table. An aperture ratio of 1:2.8 and an overall focal length $f'=100$ has been assumed.

|  |  | lens | $n_d$ | $V_d$ |
|---|---|---|---|---|
| $r_1=+\ 47.60$ | $d_1=\ 5.12$ | $L_1$ | 1.7234 | 38.0 |
| $r_2=+105.18$ | $d_2=\ 0.21$ |  |  | air space |
| $r_3=+\ 29.70$ | $d_3=\ 7.25$ | $L_2$ | 1.6172 | 54.0 |
| $r_4=+486.52$ | $d_4=\ 5.42$ | $L_3$ | 1.6483 | 33.8 |
| $r_5=+\ 19.01$ | $d_5=20.82$ |  |  | air space |
| $r_6=-\ 21.74$ | $d_6=\ 2.79$ | $L_4$ | 1.7847 | 25.7 |
| $r_7=-\ 29.40$ | $d_7=\ 0.13$ |  |  | air space |
| $r_8=-132.55$ | $d_8=\ 8.80$ | $L_5$ | 1.6583 | 57.3 |
| $r_9=-\ 30.99$ |  |  |  |  |
| total axial length=50.54 |  |  |  |  |

It will be noted from the foregoing table that the objective dimensioned in accordance therewith and illustrated in the drawing consists of five lenses all with a refractive index greater than 1.6, but less than 1.72 in the case of all lenses other than $L_1$ and $L_4$. Since the refractive indices of the outer front and rear members $L_1$, $L_5$ are 1.7234 and 1.6583, respectively, the mean of these indices lies within the aforementioned range of 1.68 to 1.72, the refractive index of the rear member ($L_5$), alone, being appreciably less than 1.68. The rear dispersive meniscus $L_4$ has a refractive index greater than 1.78. The first lens $L_2$ of the compound member $L_2$, $L_3$ has an index of refraction which is less than 1.63 and which is exceeded by that of the companion lens $L_3$, the difference between these two indices being 0.0311, hence greater than 0.03. It will also be seen that the ratio of the lengths of the radii $r_3$ and $r_5$ is about 1.58, thus lying between 1.5 and 1.6, the length of the outer radius $r_3$ being 29.70 which is greater than 0.2 but not more than substantially 0.3 times the overall focal length $f'$ of the objective. The total axial length, computed as the sum of the dimensions $d_1$–$d_8$, is 50.54 and is, therefore, greater than 0.45 but less than 0.6 times the overall focal length $f'$, in keeping with the aforestated requirement for optimal results.

It should be understood that departures from the specific arrangement illustrated and from the precise values given above are permissible without departing from the spirit and scope of our invention as defined in the appended claims.

We claim:

1. An optical objective system of the Gaussian type, comprising four meniscus-shaped, air-spaced members including an outer pair of front and rear collective members and an inner pair of front and rear dispersive members, the members of each pair having their convex sides averted from each other, the front member of said inner pair including a first and a second lens, the mean of the refractive indices of said outer pair of members for the yellow helium line ranging between 1.68 and 1.72, the refractive index of said rear member of said inner pair being greater than 1.78, the refractive index of said first lens being less than 1.63, the refractive index of said second lens exceeding that of said first lens by at least substantially 0.03, the ratio of the outer radius of said first lens to the outer radius of said second lens of said inner front member being between substantially 1.5 and 1.6, said outer radius of said first lens being greater than 0.2 but not more than substantially 0.3 times the overall focal length of said system.

2. An optical objective system of the Gaussian type, comprising four meniscus-shaped, air-spaced members consisting altogether of a first, second, third, fourth and fifth lens, said second and said third lens being cemented together and forming the first of an inner, dispersive pair of said members enclosed by an outer, collective pair of said members, the members of each pair having their convex sides averted from each other, said second lens being a collective lens, the mean of the refractive indices of said first and fifth lenses for the yellow helium line ranging between 1.68 and 1.72, the refractive index of said fifth lens being substantially less than 1.68, the refractive index of said fourth lens being greater than 1.78, the refractive index of said second lens being less than 1.63, the refractive index of said third lens exceeding that of said second lens by at least substantially 0.03, the ratio of the outer radius of said second lens to the outer radius of said third lens being between substantially 1.5 and 1.6, said outer radius of said second lens being greater than 0.2 but not more than substantially 0.3 times the overall focal length of said system, the total axial length of said system being more than 0.45 times but less than 0.6 times said overall focal length.

3. An optical objective system of the Gaussian type, comprising four meniscus-shaped, air-spaced members consisting altogether of a first lens $L_1$ with radii $r_1$, $r_2$ and thickness $d_1$, a second lens $L_2$ with radii $r_3$, $r_4$ and thickness $d_3$, a third lens $L_3$ with radii $r_4$, $r_5$ and thickness $d_4$, a fourth lens $L_4$ with radii $r_6$, $r_7$ and thickness $d_6$, and a fifth lens $L_5$ with radii $r_8$, $r_9$ and thickness $d_8$, said second and third lenses being cemented together and constituting the first of an inner, dispersive pair of said members enclosed by an outer, collective pair of said members, said outer pair of members consisting of said first and fifth lenses, the members of each pair having their convex sides averted from each other, said radii and thicknesses, the spacing $d_2$ between said first and second members, the spacing $d_5$ between said third and fourth lenses, the spacing $d_7$ between said fourth and fifth lenses, the refractive indices $n_d$ of said lenses and the Abbé numbers $V_d$ of said lenses having substantially the numerical values given by the following table, the overall focal length of the system for the yellow helium line having the numerical value of 100 with an aperture ratio of substantially 1:2.8:

Lens $L_1$: $r_1=+47.60$, $r_2=+105.18$, $d_1=5.12$,
$\qquad n_d=1.7234$, $V_d=38.0$;
Air space $\qquad d_2=0.21$;
Lens $L_2$: $r_3=+29.70$, $r_4=+486.52$, $d_3=7.25$,
$\qquad n_d=1.6172$, $V_d=54.0$;
Lens $L_3$: $r_4=+486.52$, $r_5=+19.01$, $d_4=5.42$,
$\qquad n_d=1.6483$, $V_d=33.8$;
Air space $\qquad d_5=20.82$;
Lens $L_4$: $r_6=-21.74$, $r_7=-29.40$, $d_6=2.79$,
$\qquad n_d=1.7847$, $V_d=25.7$;
Air space $\qquad d_7=0.13$;
Lens $L_5$: $r_8=-132.55$, $r_9=-30.99$, $d_8=8.80$,
$\qquad n_d=1.6583$, $V_d=57.3$.

4. An optical objective system of the Gaussian type, comprising four meniscus-shaped, air-spaced members including an outer pair of front and rear collective members and an inner pair of front and rear dispersive members, the members of each pair having their convex sides averted from each other, the front member of said inner pair including a first and a second lens, the mean of the refractive indices of said outer pair of members for the yellow helium line ranging between 1.68 and 1.72, the refractive index of said rear member of said inner pair being greater than 1.78, the refractive index of said first lens being less than 1.63, the refractive index of said second lens exceeding that of said first lens by at least substantially 0.03, the total axial length of said system being more than 0.45 times but less than 0.6 times its overall focal length.

References Cited in the file of this patent

UNITED STATES PATENTS

| Number | Name | Date |
|---|---|---|
| 660,202 | Rudolph | Oct. 23, 1900 |
| 2,171,640 | Berek | Sept. 5, 1939 |
| 2,499,264 | Wynne | Feb. 28, 1950 |
| 2,649,023 | Tronnier | Aug. 18, 1953 |

FOREIGN PATENTS

| Number | Country | Date |
|---|---|---|
| 575,076 | Great Britain | Feb. 1, 1946 |